(12) United States Patent
Carlsson et al.

(10) Patent No.: US 12,418,643 B1
(45) Date of Patent: Sep. 16, 2025

(54) CALIBRATING HEADS-UP DISPLAY USING INFRARED-RESPONSIVE MARKERS

(71) Applicant: Distance Technologies Oy, Helsinki (FI)

(72) Inventors: Thomas Carlsson, Vantaa (FI); Ville Vehkaperä, Oulu (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 18/933,320

(22) Filed: Oct. 31, 2024

(51) Int. Cl.
| | |
|---|---|
| *G09G 5/00* | (2006.01) |
| *G02B 27/00* | (2006.01) |
| *G02B 27/01* | (2006.01) |
| *H04N 13/254* | (2018.01) |
| *H04N 13/296* | (2018.01) |
| *H04N 13/327* | (2018.01) |
| *H04N 13/383* | (2018.01) |

(52) U.S. Cl.
CPC ....... *H04N 13/327* (2018.05); *G02B 27/0093* (2013.01); *G02B 27/0101* (2013.01); *H04N 13/254* (2018.05); *H04N 13/296* (2018.05); *H04N 13/383* (2018.05); *G02B 2027/013* (2013.01); *G02B 2027/0138* (2013.01); *G02B 2027/014* (2013.01)

(58) Field of Classification Search
CPC ............... H04N 13/327; H04N 13/254; H04N 13/296; H04N 13/383; G02B 27/0093; G02B 27/0101; G02B 2027/013; G02B 2027/0138; G02B 2027/014
See application file for complete search history.

(56) References Cited

U.S. PATENT DOCUMENTS

| | | | | |
|---|---|---|---|---|
| 8,550,628 B2* | 10/2013 | Durnell | ................. | G03B 13/02 |
| | | | | 351/221 |
| 9,983,412 B1* | 5/2018 | Fuchs | ................ | G02B 27/0172 |
| 12,326,566 B1* | 6/2025 | Strandborg | ........ | G02B 27/0093 |
| 2014/0015942 A1* | 1/2014 | Said | ........................ | G02B 30/27 |
| | | | | 348/59 |
| 2016/0139413 A1* | 5/2016 | Gribetz | .............. | G02B 27/0172 |
| | | | | 359/631 |
| 2018/0330693 A1* | 11/2018 | Naruse | ................... | G06V 40/19 |
| 2019/0034765 A1* | 1/2019 | Kaehler | ................ | G06V 40/28 |
| 2020/0049946 A1* | 2/2020 | Peuhkurinen | .......... | G02B 7/287 |

(Continued)

FOREIGN PATENT DOCUMENTS

WO    WO-2018111895 A1 *  6/2018  .......... G02B 6/0016

*Primary Examiner* — Howard D Brown, Jr.
(74) *Attorney, Agent, or Firm* — ZIEGLER IP LAW GROUP, LLC.

(57) ABSTRACT

A system includes an infrared (IR) light source(s); IR camera(s); an optical combiner, wherein a set of IR-responsive markers are located in at least one of: (i) within the optical combiner, (ii) on a semi-reflective surface of the optical combiner; and processor(s) configured to: control the IR camera(s) to capture IR image(s) of the optical combiner, whilst controlling the IR light source(s) to emit IR light towards the optical combiner; detect at least a subset of the set of IR-responsive markers in the IR image(s); for a given IR-responsive marker detected in the IR image(s), determine a deformation in a shape of the given IR-responsive marker with respect to a reference shape; and determine a curvature of the optical combiner, based on respective deformations in shapes of IR-responsive markers in at least said subset.

18 Claims, 2 Drawing Sheets

(56) References Cited

U.S. PATENT DOCUMENTS

| | | | | |
|---|---|---|---|---|
| 2020/0090569 A1* | 3/2020 | Hajati | .................. | G09G 3/02 |
| 2020/0225400 A1* | 7/2020 | Stannard | ................ | G02B 27/14 |
| 2021/0183102 A1* | 6/2021 | Tang | ...................... | G06T 15/06 |
| 2023/0379449 A1* | 11/2023 | Benishti | .............. | G06V 40/193 |

\* cited by examiner

CALIBRATING HEADS-UP DISPLAY USING INFRARED-RESPONSIVE MARKERS

TECHNICAL FIELD

The present disclosure relates to systems for calibrating heads-up displays using infrared-responsive markers. The present disclosure also relates to methods for calibrating heads-up displays using infrared-responsive markers.

BACKGROUND

Glasses-free augmented-reality (AR) systems (such as automotive head-up displays (HUDs) or similar) have emerged as a significant advancement for presenting visual information to users without diverting their attention from their primary tasks, for example, such as driving a vehicle. Some HUDs utilise an optical combiner (for example, in a form of a windshield of the vehicle) which typically reflects a corresponding part of light emanating from a display towards a given eye of a user, in order to display the visual information to the user. Furthermore, said HUDs are typically designed for single-user scenarios, primarily due to their limited fields of view, and consequently, have small eye boxes (namely, viewing areas). In such a case, either a curvature of the optical combiner does not pose any significant issues, or even where said curvature may impact an overall image quality, static and pre-defined curvature compensation techniques are employed during AR rendering.

However, when a field-of-view of the display and a viewing area increase in an HUD, the curvature of the optical combiner becomes highly significant, as it directly influences an accuracy of AR rendering. Further, a long-term reliability of the optical combiner faces significant challenges in real-world applications, particularly, in dynamic environments such as moving vehicles. Over an operational lifetime of a vehicle, various types of stresses (for example, such as thermal expansion and contraction, tensile stress-induced deformations, mechanical wear and tear, and the like) are exerted on the vehicle (particularly, on the optical combiner). This results in subtle yet consequential alterations in at least one of: a position, an orientation, the curvature, of the optical combiner. Some of these alterations also occur when the windshield of the vehicle (namely, the optical combiner) needs to be replaced or repaired. Thus, in such a case, employment of said static and pre-defined curvature compensation techniques is inefficient and unreliable. Resultantly, spatial reconstruction of 3D scenes and objects is compromised (namely, becomes inaccurate), and an overall viewing experience of the user is adversely affected, and becomes unrealistic and non-immersive.

Therefore, in light of the foregoing discussion, there exists a need to overcome the aforementioned drawbacks.

SUMMARY

The present disclosure seeks to provide a system and a method which facilitate a simple, yet accurate and reliable way to determine a curvature of the optical combiner, by way of determining deformations in shapes of IR-responsive markers as captured in infrared (IR) images with respect to respective reference shapes of said IR-responsive markers. The aim of the present disclosure is achieved by a system and a method which incorporate calibration of a heads-up display using infrared-responsive markers, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  at least one infrared (IR) light source;
  at least one IR camera;
  an optical combiner arranged on an optical path of a light field display unit and on an optical path of a real-world light field of a real-world environment, wherein a semi-reflective surface of the optical combiner faces the at least one IR camera, and wherein a set of IR-responsive markers are located in at least one of: (i) within the optical combiner, (ii) on the semi-reflective surface of the optical combiner; and
  at least one processor configured to:
    control the at least one IR camera to capture at least one IR image of the optical combiner, whilst controlling the at least one IR light source to emit IR light towards the optical combiner;
    detect at least a subset of the set of IR-responsive markers in the at least one IR image;
    for a given IR-responsive marker detected in the at least one IR image, determine a deformation in a shape of the given IR-responsive marker as captured in the at least one IR image with respect to a reference shape of the given IR-responsive marker; and
    determine a curvature of the optical combiner, based on respective deformations in shapes of IR-responsive markers in at least said subset of the set.

In a second aspect, an embodiment of the present disclosure provides a method comprising:

controlling at least one infrared (IR) camera to capture at least one IR image of an optical combiner, whilst controlling at least one IR light source to emit IR light towards the optical combiner, wherein the optical combiner is arranged on an optical path of a light field display unit and on an optical path of a real-world light field of a real-world environment, wherein a semi-reflective surface of the optical combiner faces the at least one IR camera, and wherein a set of IR-responsive markers are located in at least one of: (i) within the optical combiner, (ii) on the semi-reflective surface of the optical combiner;

detecting at least a subset of the set of IR-responsive markers in the at least one IR image;

for a given IR-responsive marker detected in the at least one IR image, determining a deformation in a shape of the given IR-responsive marker as captured in the at least one IR image with respect to a reference shape of the given IR-responsive marker; and determining a curvature of the optical combiner, based on respective deformations in shapes of IR-responsive markers in at least said subset of the set.

The present disclosure provides the aforementioned system and the aforementioned method which facilitate a simple, yet accurate and reliable to determine the curvature of the optical combiner, in a time-efficient and computationally-efficient manner. Herein, since the reference shape of the given IR-responsive marker is pre-known, the deformation (namely, distortion) in the shape of the given IR-responsive marker as captured in the at least one IR image with respect to the reference shape is determined, in order to determine the curvature of the optical combiner. Such a deformation in the shape of the given IR-responsive marker could be known, for example, by comparing the shape of the given IR-responsive marker with the reference shape to determine a deviation (for example, such as a linear deviation and/or an angular deviation) between a given point on the given IR-responsive marker represented in the at least one IR image and a corresponding point on a same IR-responsive marker (having an original, undistorted shape) represented in at least one reference image, wherein said deviation is caused due to the curvature of the optical combiner. In this way, the at least one processor could determine a mathematical model or a mathematical function describing the curvature of the optical combiner.

Advantageously, when the at least one processor has a knowledge pertaining to the curvature of the optical combiner, any geometrical aberrations arising due to the curvature of the optical combiner are easily corrected (namely, compensated) on-the-fly in a dynamic manner, as compared to the prior art where static and pre-defined curvature compensation techniques are employed. As an example, such a curvature compensation may be required when generating an input (such as in a form of a light field image) to be employed at the light field display unit, for producing a synthetic light field that presents virtual content. This may enhance an overall viewing experience of a given user, for example, in terms of realism and immersiveness, when the virtual content is shown to the given user. The system and the method enable in determining the curvature of the optical combiner even in real-world scenarios where an enclosed space (such as in a form of a cabin of a vehicle) is being used, and where any part of the enclosed space may be exposed to wear and tear (for example, such as due to a mechanical stress, a thermal stress, and the like) over a period of time. The system and the method are susceptible to be employed where head-up displays (HUDs) have relatively large fields of view and eye boxes (namely, viewing areas), without comprising an accuracy of augmented-reality (AR) rendering (namely, the virtual content). The system and the method are simple, robust, fast, reliable, and support real-time on-the-fly determination of the curvature of the optical combiner, and can be implemented with ease.

Notably, the at least one processor controls an overall operation of the system. The at least one processor is communicably coupled to at least the at least one IR source and the at least one IR camera, and optionally, to the light field display unit. In some implementations, the at least one processor is implemented as a processor of the light field display unit. In other implementations, the at least one processor is implemented as a processor of a computing device. Examples of the computing device include, but are not limited to, a laptop, a tablet, a phablet, and a smartphone. In yet other implementations, the at least one processor is implemented as a cloud server (namely, a remote server) that provides a cloud computing service.

Optionally, the system is implemented in an enclosed space. Herein, the term "enclosed space" refers to a physical space that is at least partially surrounded by boundaries or coverings. In other words, the enclosed space could either be a partially enclosed space or a fully enclosed space. Optionally, the enclosed space is in a form of a cabin of a vehicle. Examples of the vehicle include, but are not limited to, an aircraft, a car, a truck, and a ship. The car could be a convertible car or a hardtop car. The vehicle could also be a semi-open vehicle (such as a boat).

It will be appreciated that for capturing the at least one IR image, the at least one IR camera is arranged (namely, positioned and oriented) to face the optical combiner in a manner that the optical combiner lies in a field of view of the at least one IR camera. In this regard, the at least one IR image is captured from a perspective of a given viewing position and a given viewing angle of the at least one IR camera. An image capturing operation is well-known in the art. It is to be understood that when the semi-reflective surface of the optical combiner faces the at least one IR camera, it means that (i) the semi-reflective surface of the optical combiner may directly face the at least one IR camera (namely, in almost a straight manner), or (ii) the semi-reflective surface of the optical combiner faces the at least one IR camera in a diagonal manner (namely, obliquely or sideways).

Throughout the present disclosure, the term "infrared light source" refers to an equipment that is capable of projecting (namely, emitting) the IR light. Optionally, the at least one IR light source comprises a plurality of light-emitting elements, wherein a given light-emitting element is any one of: a light-emitting diode (LED), a projector, a display, a laser. The laser may be a vertical-cavity surface-emitting laser (VCSEL), an edge-emitting laser (EEL), or the like. The at least one IR light source is arranged to face the semi-reflective surface of the optical combiner for projecting the IR light onto the semi-reflective surface of the optical combiner. Optionally, an orientation and/or a position of the at least one IR light source is controllable by the at least one processor.

Throughout the present disclosure, the term "infrared-responsive marker" refers to an object that is capable of interacting with the IR light in a manner that allows a given IR-responsive marker to be detected in a given IR image captured by the at least one IR camera. In some implementations, the given IR-responsive marker is a retroreflective IR-responsive marker which reflects the IR light incident thereupon, and appears as a bright spot (namely, a highlyreflective spot) in the given IR image. In other implementations, the given IR-responsive marker is an absorptive blocking IR-responsive marker which absorbs the IR light incident thereupon, and appears as a black spot (namely, a dark spot or an opaque spot) in the given IR image. It will be appreciated that a reference shape and/or a reference size of the given IR-responsive marker is/are pre-known to the at least one processor. In an example, the given IR-responsive marker may be in a form of a dot, a line, a pattern, or similar. Some of the IR-responsive markers in the set may have a same reference shape and/or a same reference size, while a remainder of the IR-responsive markers in the set may have different reference shapes and/or different reference sizes.

It will be appreciated that when the set of IR-responsive markers are located within the optical combiner, it means that a given IR-responsive marker in said set could be embedded/integrated within a structure of the optical combiner itself. However, when the set of IR-responsive markers are located on the semi-reflective surface of the optical combiner, it means that a given IR-responsive marker in said set is arranged/placed only on a surface (i.e., the semi-reflective surface) of the optical combiner. It will also be appreciated that the IR-responsive markers (specifically, retroreflective IR markers) are located in the at least one of: (i) within the optical combiner, (ii) on the semi-reflective surface of the optical combiner, in a manner that the IR-responsive markers do not interfere with a direct viewing for a given user via the optical combiner. In this regard, the retroreflective IR markers could be designed to reflect: (i) light of specific wavelengths (namely, light of IR wavelengths) off the optical combiner, while light of other wavelengths (namely, light of visible wavelengths) passes through the optical combiner without any obstruction, and/or (ii) light incident at specific angles, wherein a reflection of said light off the optical combiner depends on a position and an orientation of the at least one IR camera in relation to the optical combiner.

Throughout the present disclosure, the term "light field display unit" refers to a specialised equipment that is capable of producing a synthetic light field. Optionally, the light field display unit is utilised to employ an input (generated by the at least one processor) to produce the synthetic light field at a given resolution. Information pertaining to said input for producing the synthetic light field will be discussed later in detail. It will be appreciated that different types of light field display units can be implemented. For example, the light field display unit can be any one of: a hogel-based light field display unit, a lenticular array-based light field display unit, a parallax barrier-based light field display unit, a hologram-projector-based light field display unit, a scanning-laser-based light field display unit, a cathode ray tube (CRT)-like light field display unit. All the aforementioned forms of light field display units are well-known in the art.

Throughout the present disclosure, the term "optical combiner" refers to a specialised equipment that is capable of at least reflecting the IR light emitted by the at least one IR light source onto the semi-reflective surface of the optical combiner. Optionally, the optical combiner is further capable of reflecting a corresponding part of the synthetic light field (produced by the light field display unit) towards a given eye of the given user, whilst optically combining said part of the synthetic light field with the real-world light field (as discussed later in detail). Optionally, the optical combiner is implemented by way of at least one of: a semi-transparent mirror, a semi-transparent film, a semi-transparent flexible membrane, a beam splitter, a lens, a mirror, a prism, an optical waveguide, a polarizer. Optical combiners are well-known in the art. Optionally, a tilt angle of the optical combiner with respect to an image plane of the light field display unit lies in a range of 10 degrees and 75 degrees. In an example implementation, when the system is implemented in the enclosed space which is in the form of a cabin of a vehicle (as described earlier), a windshield of the vehicle could be utilised as the optical combiner. In such a case, the optical combiner would have a curved surface (namely, a curvature). Moreover, when a plurality of users are present inside the cabin of the vehicle, some users may directly face the optical combiner, while remaining users may face the optical combiner in a diagonal manner.

Throughout the present disclosure, the term "real-world light field" refers to a light field emanating from the real-world environment in which the optical combiner is present. Further, the term "synthetic light field" refers to a light field that is produced (namely, generated) synthetically by the light field display unit. It will be appreciated that in case of the real-world light field, light from, for example, a natural light source (such as the Sun) and/or an artificial light source (such as a lamp, a bulb, a tube-light, or similar), are reflected off real-world objects (or their portions) to be incident towards eyes of the given user. In this way, visual information (for example, such as colour information, depth information, and the like) pertaining to said real-world objects is typically perceived by said eyes of the given user. On the other hand, in case of the synthetic light field, light emanating from the light field display unit, upon reflecting off the optical combiner, is incident towards said eyes of the given user. In this way, visual information pertaining to virtual content (presented via the synthetic light field) can be perceived by said eyes of the given user.

It will be appreciated that the at least one IR image may not only represent an IR representation of the optical combiner, but may also represent an IR representation of at least one object (or its part) that is in a proximity of the optical combiner. The term "infrared representation" encompasses intensity information represented in a given IR image, and additionally, optionally other attributes (for example, such as depth information, thermal information, transparency information, and the like) associated with the given IR image.

Upon capturing the at least one IR image, at least said subset of the set of IR-responsive markers is detected in the at least one IR image, for example, based on at least one of: shapes of IR-responsive markers of the set, a wavelength of the IR light emitted by the at least one IR light source. Information pertaining to the shape and the wavelength is pre-known to the at least one processor. It is to be understood that it may not be necessary that an entirety of the IR-responsive markers of the set are visible in the at least one IR image, and thus there may be a case where only some of the IR-responsive markers of the set are visible in the at least one IR image. Optionally, the at least one processor is configured to employ at least one image processing technique for detecting at least said subset of the set of IR-responsive markers in the at least one IR image. In an example, at least said subset of the set of IR-responsive markers in the at least one IR image can be detected, for example, by employing a filtering technique which is well-known in the art. In addition to this, the shapes of the IR-responsive markers can be determined, for example, by employing a contour-detection technique and/or a line-detection algorithm. Moreover, since the shapes of the IR-responsive markers are pre-known, a thresholding technique and/or an edge-detection technique could also be employed to easily distinguish IR-responsive markers of said subset from other object(s) captured in the at least one IR image.

It will be appreciated that when the optical combiner has a curved surface (for example, in a scenario where the windshield of the vehicle is utilised as the optical combiner), over a period of time, the curvature of the optical combiner may change (although slightly) due to at least one of: a thermal expansion of the optical combiner, a mechanical wear and tear, a replacement of the optical combiner with a new one, a repair of the optical combiner. Due to the curvature of the optical combiner, the shape of the given IR-responsive marker (as captured in the at least one IR image) would be deformed/distorted, as compared to the reference shape of the given IR-responsive marker. This is because the curvature of the optical combiner or a change in the curvature of the optical combiner potentially causes light emitting from the at least one IR light source to reflect unevenly off the curved surface of the optical combiner. It is to be understood that the aforesaid deformation in the shape of the given IR-responsive marker is a delta between the (pre-known) reference shape of the given IR-responsive marker and a current shape of the given IR-responsive marker (as captured in the at least one IR image).

Since the reference shape of the given IR-responsive marker is pre-known, the deformation (for example, such as a linear deformation and/or an angular deformation) in the (current) shape of the given IR-responsive marker is determined, in order to determine the curvature of the optical combiner. Such a deformation in the shape of the given IR-responsive marker could be known, for example, by comparing the shape of the given IR-responsive marker and the reference shape of the given IR-responsive marker. In this regard, the linear deformation could be determined, for example, by comparing coordinates of a given point on the given IR-responsive marker represented in the at least one IR image and a corresponding point on a same IR-responsive marker (having an original, undistorted shape) represented in at least one reference image. Due to the curvature of the optical combiner, the shape of the given IR-responsive marker may appear to be deformed, causing the given point to be displaced/deformed from its expected position. Similarly, the angular deformation could be determined, for example, by comparing an angle formed between a reference point and the given point, and an angle formed between said reference point and the corresponding point. Said angles could be measured with respect to a fixed axis, such as a horizontal axis. Thus, in this way, the at least one processor may utilise the respective deformations in the shapes of the IR-responsive markers in at least said subset of the set, to determine a mathematical model or a mathematical function describing the curvature of the optical combiner. As an example, the at least one processor may employ at least one regression technique or at least one curve-fitting algorithm to map the respective deformations into the mathematical model which represents a surface geometry of the optical combiner. Beneficially, when the at least one processor has a knowledge pertaining to the curvature of the optical combiner (that is determined in the aforesaid manner), any geometrical aberrations arising due to the curvature of the optical combiner could be easily corrected (namely, compensated) in a dynamic manner, for example, when generating the input for producing the synthetic light field presenting virtual content (as discussed later in detail). This may enhance an overall viewing experience of the given user, for example, in terms of realism and immersiveness, when the virtual content is shown to the given user by way of producing the synthetic light field.

It will be appreciated that in some implementations, the reference shape of the given IR-responsive marker could be captured in the at least one reference image. Herein, the term "reference image" refers to an image that is captured by the at least one IR camera in an initial condition. Such an initial condition could, for example, be when the optical combiner (implemented, for example, as the windshield of the vehicle when the system is implemented inside the cabin of the vehicle that is freshly manufactured) is not yet exposed to at least one of: wear and tear, a positional drift, a rotational drift, for example, such as due to a mechanical stress, a thermal stress, and the like. The positional drift (namely, a change in a position of the optical combiner) and the rotational drift (namely, a change in an orientation of the optical combiner) may occur, for example, when the optical combiner is to be replaced with a new one or to be repaired. Thus, for such an exemplary initial condition, the at least one reference image may be understood to be captured at a factory manufacturing step. There could also be various other initial conditions than that described hereinabove. Since the at least one reference image is captured in the initial condition, the at least one reference image can be understood to be a standard IR image of the optical combiner. In such a case, the at least one reference image would be beneficially utilised for comparing with the at least one (captured) IR image for determining the curvature of the optical combiner (as discussed earlier). In other implementations, the reference shape of the given IR-responsive marker could be pre-determined, based on a pre-defined arrangement of the at least one IR camera with respect to the optical combiner, and a pre-defined curvature of the optical combiner, wherein the pre-defined curvature is a default curvature of the optical combiner.

Optionally, the at least one IR camera comprises at least a first IR camera and a second IR camera whose fields of view overlap at least partially, wherein the at least one processor is configured to:
  detect at least one IR-responsive marker in a first IR image and a second IR image that are captured simultaneously via the first IR camera and the second IR camera, respectively;
  determine a position of the at least one IR-responsive marker, based on a first pose and a second pose of the first IR camera and the second IR camera from which the first IR image and the second IR image are captured, respectively; and
  determine the curvature of the optical combiner, based further on a change in the position of the at least one IR-responsive marker.

In this regard, when the fields of view of the first IR camera and the second IR camera overlap at least partially, and the first IR image and the second IR image are captured simultaneously, a same object (i.e., a given IR-responsive marker) would likely be visible in both the first IR image and the second IR image, however, the same object would appear to be slightly offset in the first IR image and the second IR image. In other words, the first IR image and the second IR image may constitute a stereo image pair. It is to be understood that in addition to the first IR camera and the second IR camera there may be more IR cameras, for example, such as a third IR camera and a fourth IR camera. Information pertaining to how a given IR-responsive marker is detected in a given IR image has already been discussed earlier. The term "pose" encompasses a viewing position and/or a viewing orientation. It will also be appreciated that positions and/or orientations of the first IR camera and the second IR camera are highly likely to remain unchanged once the first IR camera and the second IR camera are fixedly arranged (for example, in the enclosed space) for capturing the first IR image and the second IR image, respectively. Thus, the first pose of the first IR camera, the second pose of the second IR camera, a distance between the first IR camera and the second IR camera, an optical distance of the given IR-responsive marker from the first IR camera (from image data of the first IR image), and an optical distance of the given IR-responsive marker from the second IR camera (from image data of the second IR image) are already known and accurately known to the at least one processor. Using the aforesaid parameters, the position of the given IR-responsive marker could be easily and conveniently determined by the at least one processor, for example, by employing a triangulation technique. The triangulation technique is well-known in the art. Optionally, the position of the given IR-responsive marker is determined in a local coordinate space.

It will be appreciated that since the curvature of the optical combiner would likely change due to the at least one of: the thermal expansion of the optical combiner, the mechanical wear and tear, the replacement of the optical combiner with the new one, the repair of the optical combiner, the position of the at least one IR-responsive marker may also change with respect to any one of: a previous position of the at least one IR-responsive marker (that is pre-known to the at least one processor), a reference position of the at least one IR-responsive marker (that is pre-known to the at least one processor). In an example, a position of a given IR-responsive marker may be shifted upward or downward with respect to a reference position of the given IR-responsive marker, based on a tilt of the optical combiner with respect to a horizontal axis. In another example, the position of the given IR-responsive marker may be shifted leftward or rightward, with respect to the reference position of the given IR-responsive marker, based on a misalignment of the optical combiner with respect to a vertical axis.

Thus, the at least one processor could optionally take into account the change in the position of the at least one IR-responsive marker, when determining the mathematical model or the mathematical function describing the curvature of the optical combiner, in a similar manner as described earlier. Advantageously, when the at least one processor has a knowledge pertaining to the curvature of the optical combiner, any geometrical aberrations arising due to the curvature could be easily corrected (namely, compensated), for example, when generating the input for producing the synthetic light field presenting the virtual content (as discussed later in detail). This may potentially enhance an overall viewing experience of the given user, for example, in terms of realism and immersiveness, when the virtual content is shown to the given user by way of producing the synthetic light field.

Optionally, the at least one processor is configured to:
  detect, in the first IR image and the second IR image, at least one object that is in a proximity of the optical combiner;
  determine a position of the at least one object, based on the first pose of the first IR camera and the second pose of the second IR camera;
  determine a relative position of the at least one IR-responsive marker with respect to the at least one object, based on the position of the at least one IR-responsive marker and the position of the at least one object; and
  determine the curvature of the optical combiner, based further on the relative position of the at least one IR-responsive marker with respect to the at least one object.

In this regard, the first IR image and the second IR image may likely represent the at least one object that is in the proximity of the optical combiner, in addition to representing the optical combiner. It will be appreciated that the at least one processor may utilise at least one image processing technique (for example, such as an object detection technique) to identify different objects represented in the first IR image and the second IR image, based on their infrared reflection or absorption characteristics in the first IR image and the second IR image. Then, the at least one processor may identify corresponding features of each of the different objects in both the first IR image and the second IR image, and apply a stereo-matching technique to ascertain which common objects are visible in the first IR image and the second IR image. Thus, in order to determine the at least one object that is in the proximity of the optical combiner, the at least one processor may utilise disparity maps. The disparity maps could be determined based on depth information in the first IR image and the second IR image.

It will be appreciated that the first pose of the first IR camera, the second pose of the second IR camera, the distance between the first IR camera and the second IR camera, an optical distance of the at least one object from the first IR camera (from image data of the first IR image), and an optical distance of at least one object from the second IR camera (from image data of the second IR image) are accurately known to the at least one processor. Thus, using the aforesaid parameters, the position of the at least one object could be easily and conveniently determined by the at least one processor, for example, by employing the triangulation technique. Optionally, the position of the at least one object is determined in the local coordinate space. Furthermore, since both the position of the at least one IR-responsive marker and the position of the at least one object are known, the relative position of the at least one IR-responsive marker with respect to the at least one object can be easily and accurately determined by the at least one processor.

It will be appreciated that when the position of the at least one object changes, the relative position of the at least one IR-responsive marker would also change. In an example, when the system is implemented in the cabin of the vehicle, moving wipers of the vehicle may be in contact with the windshield of the vehicle, while the optical combiner may be in the form of a flexible roller blind. In such a case, as the moving wipers move, a position of the moving wipers would change while in contact with the windshield of the vehicle. Thus, the relative position of the at least one IR-responsive marker is taken into account when determining the curvature of the optical combiner. Beneficially, due to this, said curvature would be determined on-the-fly with an improved accuracy. This is because a movement of the at least one object provides multiple, distinct reference points over a wide area of the semi-reflective surface of the optical combiner, allowing collection of positional data from different viewing angles and viewing positions of the at least one object, thereby enhancing a precision and an accuracy of determining the curvature of the optical combiner. In the aforesaid example, extreme positions of the moving wipers (namely, on an extreme left side and an extreme right side) may be considered, and then the change in the position of the at least one IR-responsive marker may be determined with respect to the extreme positions of the moving wipers. It will also be appreciated that the at least one object could also be a non-movable object (namely, an object whose position is not changing with respect to time). In an example, the non-movable object may be a non-movable part of the vehicle that is in the proximity of the windshield, or in a contact with the windshield. Such a non-movable part of the vehicle could, for example, be an A-pillar or its part, a dashboard or its part, and the like.

Optionally, the at least one processor is configured to determine a change in at least one of: a position, an orientation, of the optical combiner, based on a change in the relative position of the at least one IR-responsive marker with respect to the at least one object. In this regard, when the optical combiner is in the form of a flexible roller blind (that is generally made up of a non-rigid material) in the vehicle (such as an aircraft), the flexible roller blind would likely be prone to positional shifts and/or orientational shifts due to effects of directional changes of the vehicle, when the vehicle is in motion. Such directional changes of the vehicle highly likely cause the optical combiner to drift (for example, by several millimetres), as the non-rigid material responds to forces acting on it during said directional changes. As the vehicle manoeuvres, the semi-reflective surface of the optical combiner may be shifted, thereby altering its position and orientation in a three-dimensional (3D) space. Such a drift can result in misalignment or inaccuracies in presenting visual information to the given user via the optical combiner. In an example, the optical combiner may be a transparent roller blind-type optical combiner which is fully rolled into a roller mechanism when the light field display unit is in a switched-off state. As said transparent roller blind-type optical combiner is pulled across a windshield or a cockpit of the vehicle, the light field display unit may be automatically switched on/activated (as an unrolling action and a rolling action could serve as an on/off switch for the light field display unit). The transparent roller blind-type optical combiner could either be unrolled in a horizontal direction (for example, from right to left) or in a vertical direction (for example, from bottom to top) and hooked up to an opposite side, for example, using magnets.

In order to mitigate the aforesaid potential issue, once the change in the relative position of the at least one IR-responsive marker is known, the at least one processor can easily and accurately determine the change in the at least one of: the position, the orientation, of the optical combiner. This is because assuming the position of the at least one object to be constant, the relative position of the at least one IR-responsive marker with respect to the at least one object would serve as a reliable reference point. By comparing a previous relative position of the at least one IR-responsive marker and a current relative position of the at least one IR-responsive marker, the at least one processor can calculate the positional shifts and/or the orientational shifts of the optical combiner, and hence the change in the at least one of: the position, the orientation, of the optical combiner. Advantageously, when the at least one processor has a knowledge pertaining to the change in the at least one of: the position, the orientation, of the optical combiner, any geometrical aberrations arising due to said change could be easily corrected (namely, compensated), for example, when generating the input for producing the synthetic light field presenting virtual content (as discussed later in detail). This may enhance an overall viewing experience of the given user, for example, in terms of realism and immersiveness, when the virtual content is shown to the given user by way of producing the synthetic light field, regardless of the vehicle's movement.

Optionally, the system further comprises at least one additional camera, wherein the at least one IR camera lies in a field of view of the at least one additional camera, and wherein the at least one processor is configured to:
  control the at least one additional camera to capture an image of the at least one IR camera;
  detect the at least one IR camera in the image;
  determine a change in at least one of: a position, an orientation, of the at least one IR camera, based on a current location of the at least one IR camera in the image, and a reference location of the at least one IR camera in a reference image; and
  determine the curvature of the optical combiner, based further on the change in the at least one of: the position, the orientation, of the at least one IR camera.

Optionally, the at least one additional camera is a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Alternatively, optionally, the at least one additional camera is an IR camera. In such a case, at least one IR-responsive marker can be arranged on the at least one IR camera that is being calibrated. Since the at least one IR camera lies in the field of view of the at least one additional camera, this allows the at least one additional camera to capture the image of the at least one IR camera. An image capturing operation is well-known in the art. The image could be a visible-light image (namely, a colour image) or an IR image, depending on a type of the at least one additional camera. It is to be understood that the at least one IR camera can be detected in the image in a similar manner in which the given IR-responsive marker is detected in the at least one IR image, as described earlier in detail.

The current location of the at least one IR camera in the image can be accurately known to the at least one processor, for example, using pixel coordinates. Moreover, the reference location of the at least one IR camera in the reference image can be pre-known to the at least one processor. In this regard, said reference image can be captured previously using the at least one additional camera, for example, during the factory manufacturing step. Thus, said reference image could be served as a basis (namely, a reference) for comparing it with the image that is currently captured by the at least one additional camera, in order to ascertain the change in the at least one of: the position, the orientation, of the at least one IR camera (as captured in the image). It will be appreciated that said change is possible due to the fact that the at least one IR camera could itself suffer from a positional drift in a real-world condition (for example, at a post-manufacturing step). In such a case, the at least one IR image would be inaccurately and unreliably captured by the at least one IR camera, and thus the curvature of the optical combiner would also be inaccurately determined, upon processing said at least one IR image. For example, mechanical tolerances, vibrations, or environmental factors may impact an accuracy of curvature estimation. In order to mitigate such a potential problem, the change in the at least one of: the position, the orientation, of the at least one IR camera is optionally taken into account, when determining the curvature of the optical combiner. Beneficially, in this way, a dynamic/continuous calibration of the at least one IR camera using the at least one additional camera can be performed for fine-tuning the curvature of the optical combiner, in order to account for positional tolerance variations in the at least one IR camera itself. In other words, by continuously monitoring and adjusting for such positional tolerance variations, the at least one processor can compensate for any discrepancies caused by a camera movement, ensuring that the curvature of the optical combiner is still accurately determined. This results in improved reliability and precision in determining the curvature of the optical combiner in real time or near-real time, even when a position of the at least one IR camera (capturing the at least one IR image of the optical combiner) is not perfectly stable.

Optionally, the system further comprises tracking means and the light field display unit, wherein the at least one processor is configured to:
- determine a relative position of a first eye and of a second eye of at least one user with respect to the optical combiner, by utilising the tracking means;
- generate an input to be employed at the light field display unit for producing a synthetic light field, based on the relative position of the first eye and of the second eye of the at least one user with respect to the optical combiner, and the curvature of the optical combiner; and
- employ the input at the light field display unit to produce the synthetic light field, wherein the optical combiner is employed to reflect a first part and a second part of the synthetic light field towards the first eye and the second eye of the at least one user, respectively, whilst optically combining the first part and the second part of the synthetic light field with the real-world light field.

The term "tracking means" refers to a specialised equipment for detecting and/or following at least a position of a given eye of the given user. The given eye encompasses at least one of: the first eye, the second eye. The first eye could be one of a left eye and a right eye of the given user, whereas the second eye could be another of the left eye and the right eye. Optionally, the tracking means is implemented as at least one tracking camera. Optionally, the at least one tracking camera comprises at least one of: at least one visible-light camera, at least one IR camera. Optionally, the at least one tracking camera further comprises at least one depth camera, in addition to the at least one of: the at least one visible-light camera, the at least one IR camera. Examples of the at least one depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of different types of cameras (for example, such as the at least one visible-light camera, the at least one IR camera and the at least one depth camera) may be utilised in the tracking means. When different types of images captured by the different types of cameras are utilised, at least the position of the given eye can be determined accurately for tracking purposes, as results obtained from one type of image can be used to refine results obtained from another type of image. The different types of images may be at least one of: visible-light images, IR images, depth images.

Optionally, when utilising the tracking means, the at least one processor is configured to process tracking data collected by the tracking means, to determine a position of the given eye of the given user at a given time instant. Optionally, in this regard, when the tracking means is implemented as the at least one tracking camera, the tracking data comprises a plurality of images (namely, visible-light images and/or IR images and/or depth images) representing at least the given eye, wherein when processing the tracking data, the at least one processor is configured to employ at least one image processing algorithm. Such image processing algorithms are well-known in the art.

It will be appreciated that the at least one tracking camera is arranged to face the given user, to facilitate the tracking of the position of the given eye. Optionally, said position is represented in a given coordinate space. As an example, the given coordinate space may be a Cartesian coordinate space. It will also be appreciated that irrespective of where the at least one tracking camera is arranged, a relative position of the at least one tracking camera with respect to the optical combiner is fixed, and is pre-known to the at least one processor. This enables to determine the relative position of the first eye and of the second eye of the given user with respect to the optical combiner. Optionally, in this regard, from the tracking data collected by the tracking means, a position of the first eye and of the second eye with respect to the at least one tracking camera is accurately known to the at least one processor. Thus, the at least one processor can easily and accurately determine the relative position of the first eye and of the second eye with respect to the optical combiner, based on the relative position of the at least one tracking camera with respect to the optical combiner and the position of the first eye and of the second eye with respect to the at least one tracking camera. Optionally, the relative position of the first eye and of the second eye is represented in the given coordinate space. In an example, when the system is implemented in the enclosed space such as the cabin of the vehicle, the given user could be a driver of the vehicle or a passenger in the vehicle sitting on a seat of the vehicle.

Furthermore, optionally, the tracking means repeatedly tracks a position of the first eye and of the second eye of the given user throughout a given session of using the system. In such a case, the at least one processor is configured to repeatedly determine the relative position of the first eye and of the second eye with respect to the optical combiner (in real time or near-real time). Beneficially, this potentially allows for presenting the given user with an augmented view of the synthetic light field with the real-world light field in an autostereoscopic manner. It is to be understood that when the synthetic light field is being produced for a plurality of users simultaneously, the at least one processor is configured to determine a relative position of the first eye and of the second eye of each user from amongst the plurality of users in a similar manner, as discussed hereinabove. Moreover, the relative position of the first eye and of the second eye is determined with respect to the optical combiner, because the synthetic light field (that is being produced by the light field display unit) would be presented to the given user via the optical combiner only.

The input employed by the light field display unit can be in different forms, depending on a type of the light field display unit that is implemented (as discussed earlier). As a first example, in case of a hogel-based light field display unit or a lenticular array-based light field display unit or a parallax barrier-based light field display unit, the input can be in a form of a light field image comprising a plurality of pixels. As a second example, in case of a hologram-projector based light field display unit, the input is in a form of a holographic recording having a holographic interference pattern. As a third example, in case of a scanning-laser based light field display unit, the input can be in a form of any one of: image data, vector graphics, vector paths. As a fourth example, in case of a cathode ray tube (CRT)-like light field display unit, the input is in a form of a video signal comprising analog electrical signals. All the aforementioned forms of light field display units and their corresponding inputs are well-known in the art.

In a case when the input is in the form of the light field image comprising the plurality of pixels, a first set of pixels from amongst the plurality of pixels is responsible for generating the first part of the synthetic light field that corresponds to the first eye, and a second set of pixels from amongst the plurality of pixels is responsible for generating the second part of the synthetic light field that corresponds to the second eye. Upon reflection of the first part and the second part of the synthetic light field from the optical combiner, visual information corresponding to the first set of pixels and the second set of pixels of the light field image is perceived by the first eye and the second eye, respectively, as a first virtual image and a second virtual image. It will be appreciated that the pixels belonging to the first set are not arranged in a continuous manner across the light field image (namely, the input); similarly, the pixels belonging to the second set are also not arranged in a continuous manner across the light field image. It will also be appreciated that if the optical combiner (as well as at least one optical layer of the light field display unit) were not curved, the pixels belonging to the first set and the pixels belonging to the second set would be arranged in alternating vertical stripes across a horizontal field of view of the light field image, wherein each vertical stripe comprises one or more scanlines of pixels. This is because humans perceive depth mainly based on horizontal binocular parallax. Notably, the light field image is considerably different from a regular 2D image that is displayed via a regular 2D display unit, because the (single) light field image comprises visual information corresponding to the first eye as well as the second eye of the at least one user. However, when the optical combiner is curved (irrespective of whether or not the at least one optical layer of the light field display unit is curved), the light field is generated in such a manner that it is deformation corrected; in this regard, the light field image is deformation corrected prior to being displayed. Consequently, the alternating stripes in which the pixels of the first set and the pixels of the second set are arranged would no more be simple vertical stripes. In other words, the stripes in which the pixels of the first set and the pixels of the second set are arranged would be in a deformed shape, rather than being straight vertical stripes. How much deformed a particular part of a stripe of pixels would be depends on an extent of curvature of a portion of the optical combiner that is employed to reflect light corresponding to that particular part of the stripe of pixels. In this way, the light field display unit is not used for a calibration process itself; instead, the synthetic light field is produced to compensate for the curvature of the optical combiner, as well as any change in the position and/or the orientation of the optical combiner (for example, in a case where an old optical combiner is to be replaced by a new optical combiner).

In some implementations, the virtual content presented by the synthetic light field corresponds to at least one virtual object. Optionally, in this regard, the at least one processor is configured to generate the input from a perspective of the relative position of the first eye and of the second eye of the at least one user, by employing a 3D model of the at least one virtual object. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model of a virtual object" refers to a data structure that comprises comprehensive information pertaining to the virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model of the at least one virtual object may be generated in the form of a 3D polygonal mesh, a 3D point cloud, a 3D surface cloud, a voxel-based model, or similar. Optionally, the 3D model of the at least one virtual object is generated in the given coordinate space. Optionally, the at least one processor is configured to store the 3D model of the at least one virtual object at the data repository.

It will be appreciated that when the optical combiner reflects the first part and the second part of the synthetic light field towards the first eye and the second eye, respectively, it means that light produced by a first part of the input, generating the first part of the synthetic light field, is directed towards the first eye upon reflecting off the optical combiner. Simultaneously, light produced by a second part of the input, generating the second part of the synthetic light field, is directed towards the second eye upon reflecting off the optical combiner. Therefore, upon said reflection of the first part and the second part of the synthetic light field, visual information corresponding to the first part of the input and the second part of the input is perceived by the first eye and the second eye, respectively. It is to be understood that due to binocular disparity, visual information for the first eye and visual information for the second eye would be slightly offset from each other. Beneficially, this enables in perceiving depth, when the virtual content is presented to the at least one user using the synthetic light field. The binocular disparity is well-known in the art. Additionally, when the first part and the second part of the synthetic light field are optically combined with the real-world light field, the virtual content is perceived by the left eye and the right eye, along with the visual information pertaining to the real-world objects present in the real-world environment. Advantageously, this provides a result that is similar to displaying a combined view of a virtual image augmenting a real-world image to the at least one user.

In an embodiment, the tracking means is implemented at least partially using the at least one IR camera. In this regard, the at least one IR camera that is employed for capturing the at least one IR image of the optical combiner, would also be utilised for capturing a plurality of IR images of the given eye of the given user, which is then processed to determine the position of the given eye of the given user at the given time instant. It will be appreciated that for the at least one IR camera to be used for serving such a dual purpose, the at least one IR camera would likely have a wide field of view to enable it to be used not only for capturing the at least one IR image of the optical combiner but also for capturing the plurality of IR images of the given eye. Beneficially, such a dual use of the at least one IR camera maximises its utility without requiring any additional hardware, making the system efficient and cost-effective. Preferably, a primary viewer such as a driver of the vehicle would likely be better served by a dedicated IR camera.

Optionally, the system further comprises:
  at least one additional IR camera facing the light field display unit; and
  optionally, at least one additional IR light source, wherein an additional set of IR-responsive markers are located on at least one optical layer of the light field display unit, and wherein the at least one processor is configured to:
- control the at least one additional IR camera to capture at least one additional IR image of the light field display unit, whilst controlling the at least one IR light source or the at least one additional IR light source to emit IR light towards the light field display unit;
- detect at least a subset of the additional set of IR-responsive markers in the at least one additional IR image;
- for a given IR-responsive marker detected in the at least one additional IR image, determine a deformation in a shape of the given IR-responsive marker as captured in the at least one additional IR image with respect to a reference shape of the given IR-responsive marker; and
- determine a curvature of the at least one optical layer of the light field display unit, based on respective deformations in shapes of IR-responsive markers in at least said subset of the additional set, wherein the input to be employed at the light field display unit is generated based further on the curvature of the at least one optical layer of the light field display unit.

It will be appreciated that for capturing the at least one additional IR image, the at least one additional IR camera is arranged (namely, positioned and oriented) to face the light field display unit in a manner that the light field display unit lies in a field of view of the at least one additional IR camera. In this regard, the at least one additional IR image is captured from a perspective of a given viewing position and a given viewing angle of the at least one additional IR camera. It is to be understood that when the at least one optical layer of the light field display unit faces the at least one additional IR camera, it means that (i) the at least one optical layer may directly face the at least one additional IR camera (namely, in almost a straight manner), or (ii) the at least one optical layer faces the at least one additional IR camera in a diagonal manner (namely, obliquely or sideways).

In some implementations, the at least one additional IR light source may be employed for the light field display unit. In other implementations, the at least one IR light source may be employed for both the optical combiner and the light field display unit. In such implementations, the at least one IR light source would have a relatively larger beam angle, as compared to a case where the at least one additional IR light source may be employed for the light field display unit. The at least one IR light source or the at least one additional IR light source is arranged to face the light field display unit for projecting the IR light onto the at least one optical layer of the light field display unit. Optionally, an orientation and/or a position of the at least one additional IR light source is controllable by the at least one processor.

It will be appreciated that the at least one additional IR image represents an IR representation of the light field display unit, and additionally optionally, represents an IR representation of at least one object (or its part) that is in a proximity of the light field display unit. Upon capturing the at least one additional IR image, at least said subset of the additional set of IR-responsive markers is detected in the at least one additional IR image, for example, based on at least one of: shapes of IR-responsive markers of the additional set, a wavelength of the IR light emitted by the at least one IR light source or the at least one additional IR light source, in a similar manner as described earlier. Optionally, the at least one processor is configured to employ the at least one image processing technique for detecting at least said subset of the additional set of IR-responsive markers in the at least one additional IR image, in a similar manner as described earlier.

It will be appreciated that when the at least one optical layer of the light field display unit has a curved surface, the shape of the given IR-responsive marker (as captured in the at least one additional IR image) and the reference shape of the given IR-responsive marker would be significantly different. In other words, there would be a deformation in the shape of the given IR-responsive marker with respect to the reference shape of the given IR-responsive marker. This is because the curvature of the at least one optical layer potentially causes the IR light emitting from the at least one IR light source to reflect unevenly off the curved surface of the at least one optical layer. It is to be understood that the aforesaid deformation in the shape of the given IR-responsive marker is a delta between the (pre-known) reference shape of the given IR-responsive marker and a current shape of the given IR-responsive marker (as captured in the at least one additional IR image). It is also to be understood that, over a period of time, the curvature of the at least one optical layer may also change (although slightly) due to at least one of: a thermal expansion of the at least one optical layer of the light field display unit, mechanical wear and tear, a replacement of the light field display unit with a new one, a repair of the light field display unit.

Since the reference shape of the given IR-responsive marker is pre-known, the deformation (for example, such as a linear deformation and/or an angular deformation) in the (current) shape of the given IR-responsive marker is determined, in order to determine the at least one optical layer. Such a deformation in the shape of the given IR-responsive marker could be known, for example, by comparing the shape of the given IR-responsive marker and the reference shape of the given IR-responsive marker. Thus, the at least one processor may utilise the respective deformations in the shapes of the IR-responsive markers in at least said subset of the additional set, to determine a mathematical model or a mathematical function describing the curvature of the at least one optical layer of the light field display unit, in a similar manner as discussed earlier in detail. Beneficially, when the at least one processor has a knowledge pertaining to the curvature of the at least one optical layer of the light field display unit, the input that is to be employed at the light field display unit is generated accordingly, by taking into account the curvature of the at least one optical layer. In a case when the input is in the form of the light field image comprising the plurality of pixels, and when the at least one optical layer is curved, the light field image is generated in such a manner that it is deformation corrected, prior to being displayed. Beneficially, any geometrical aberrations arising due to the curvature of the at least one optical layer could be easily corrected (namely, compensated) in a dynamic manner, when generating the input. This potentially enhances an overall viewing experience of the given user, for example, in terms of realism and immersiveness, when the virtual content is shown to the given user by way of producing the synthetic light field.

In some implementations, the reference shape of the given IR-responsive marker could be captured in the at least one reference image that is captured by the at least one additional IR camera. In other implementations, the reference shape of the given IR-responsive marker could be pre-determined, based on a pre-defined arrangement of the at least one additional IR camera with respect to the light field display unit, and a pre-defined curvature of the at least one optical layer of the light field display unit, wherein the pre-defined curvature is a default curvature of the at least one optical layer.

Optionally, the set of IR-responsive markers are implemented as absorptive IR-blocking markers, and wherein the semi-reflective surface is IR reflecting, wherein the at least one processor is configured to:
 detect a face of at least one user in the at least one IR image; and
 determine a relative position of a head or eyes of the at least one user with respect to the optical combiner, based on a location of the face in the at least one IR image.

In this regard, the semi-reflective surface of the optical combiner is IR reflecting except for areas on the semi-reflective surface where the absorptive IR-blocking markers would be located. In such an implementation, the at least one IR camera captures the at least one IR image, wherein the IR light is reflected off the semi-reflective surface except for said areas on the semi-reflective surface where the absorptive IR-blocking markers would be located. Thus, the absorptive IR-blocking markers appear as black or opaque spots in the at least one IR image. It will be appreciated that the at least one processor detects the face of at least one user in the at least one captured IR image, for example, by analysing the at least one IR image to detect key facial contours and patterns. Once the face is detected, the at least one processor can determine the relative position of the head or the eyes of the at least one user with respect to the optical combiner. This can be done by analysing the location of the face within the IR image, taking into account the reflection of the user's face off the semi-reflective surface. Since representations of the IR-responsive markers in the at least one IR image would serve as fixed reference points, the at least one processor can accurately determine a position of the head or the eyes, considering the location of the face in the at least one IR image. The technical benefit of this is that a face tracking of the user can be performed highly accurately and conveniently, without requiring any additional sensors. The use of absorptive IR-blocking markers ensures that these reference points do not interfere with the IR reflection, allowing for clear detection of the user's facial features.

The present disclosure also relates to the method as described above. Various embodiments and variants disclosed above, with respect to the aforementioned first aspect, apply mutatis mutandis to the method.

Optionally, the at least one IR camera comprises at least a first IR camera and a second IR camera whose fields of view overlap at least partially, wherein the method further comprises:
 detecting at least one IR-responsive marker in a first IR image and a second IR image that are captured simultaneously via the first IR camera and the second IR camera, respectively;
 determining a position of the at least one IR-responsive marker, based on a first pose and a second pose of the first IR camera and the second IR camera from which the first IR image and the second IR image are captured, respectively; and
 determining the curvature of the optical combiner, based further on a change in the position of the at least one IR-responsive marker.

Optionally, the method further comprises:
 detecting, in the first IR image and the second IR image, at least one object that is in a proximity of the optical combiner;
 determining a position of the at least one object, based on the first pose of the first IR camera and the second pose of the second IR camera;
 determining a relative position of the at least one IR-responsive marker with respect to the at least one object, based on the position of the at least one IR-responsive marker and the position of the at least one object; and
 determining the curvature of the optical combiner, based further on the relative position of the at least one IR-responsive marker with respect to the at least one object.

Optionally, the method further comprises determining a change in at least one of: a position, an orientation, of the optical combiner, based on a change in the relative position of the at least one IR-responsive marker with respect to the at least one object.

Optionally, the method further comprises:
 controlling at least one additional camera to capture an image of the at least one IR camera, wherein the at least one IR camera lies in a field of view of the at least one additional camera;
 detecting the at least one IR camera in the image;
 determining a change in at least one of: a position, an orientation, of the at least one IR camera, based on a current location of the at least one IR camera in the image, and a reference location of the at least one IR camera in a reference image; and
 determining the curvature of the optical combiner, based further on the change in the at least one of: the position, the orientation, of the at least one IR camera.

Optionally, the method further comprises:
 determining a relative position of a first eye and of a second eye of at least one user with respect to the optical combiner, by utilising tracking means;
 generating an input to be employed at the light field display unit for producing a synthetic light field, based on the relative position of the first eye and of the second eye of the at least one user with respect to the optical combiner, and the curvature of the optical combiner; and
 employing the input at the light field display unit to produce the synthetic light field, wherein the optical combiner is employed to reflect a first part and a second part of the synthetic light field towards the first eye and the second eye of the at least one user, respectively, whilst optically combining the first part and the second part of the synthetic light field with the real-world light field.

Optionally, in the method, the tracking means is implemented at least partially using the at least one IR camera.

Optionally, the method further comprises:
 controlling at least one additional IR camera to capture at least one additional IR image of the light field display unit, whilst controlling the at least one IR light source or at least one additional IR light source to emit IR light towards the light field display unit, wherein the at least one additional IR camera faces the light field display unit, and wherein an additional set of IR-responsive markers are located on at least one optical layer of the light field display unit;
 detecting at least a subset of the additional set of IR-responsive markers in the at least one additional IR image;

for a given IR-responsive marker detected in the at least one additional IR image, determining a deformation in a shape of the given IR-responsive marker as captured in the at least one additional IR image with respect to a reference shape of the given IR-responsive marker; and determining a curvature of the at least one optical layer of the light field display unit, based on respective deformations in shapes of IR-responsive markers in at least said subset of the additional set, wherein the input to be employed at the light field display unit is generated based further on the curvature of the at least one optical layer of the light field display unit.

Optionally, the set of IR-responsive markers are implemented as absorptive IR-blocking markers, and wherein the semi-reflective surface is IR reflecting, wherein the method further comprises:

detecting a face of at least one user in the at least one IR image; and determining a relative position of a head or eyes of the at least one user with respect to the optical combiner, based on a location of the face in the at least one IR image.

DETAILED DESCRIPTION OF THE DRAWINGS

Figure 1A:
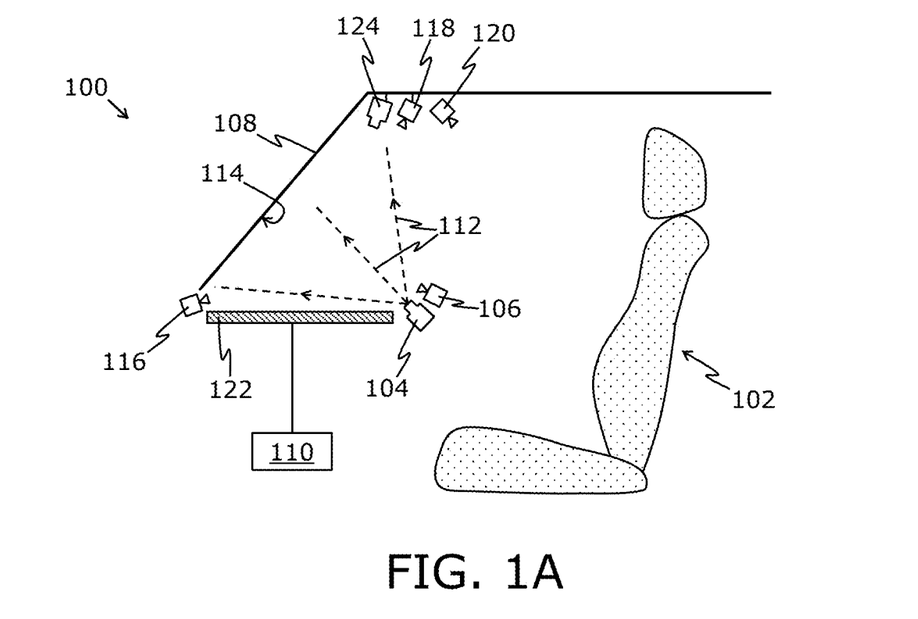
FIG. 1A and FIG. 1B illustrate an exemplary scenario of implementing a system for calibrating a heads-up display using infrared-responsive markers, in accordance with an embodiment of the present disclosure.
Figure 1B:
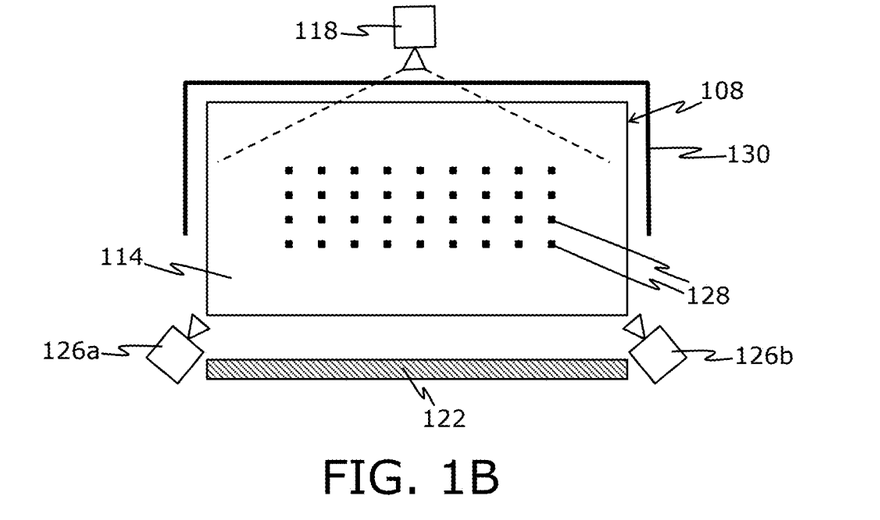

Referring to FIG. 1A and FIG. 1B, illustrated is a simplified example implementation of a system 100 for calibrating a heads-up display using infrared-responsive markers, in accordance with an embodiment of the present disclosure. The system 100 is shown to be implemented inside a cabin of a vehicle (for example, such as a car). For sake of simplicity and clarity, in FIG. 1A, a side view of the cabin of the vehicle is depicted, while in FIG. 1B, a front view from a perspective of a seat 102 of the vehicle is depicted.

With reference to FIG. 1A, the system 100 is shown to comprise at least one infrared (IR) light source (for example, depicted as an IR light source 104), at least one IR camera (for example, depicted as an IR camera 106), an optical combiner 108, and at least one processor (for example, depicted as a processor 110). The IR camera 106 is controlled to capture IR image(s) of the optical combiner 108, whilst the IR light source 104 is controlled to emit IR light 112 towards the optical combiner 108. A semi-reflective surface 114 of the optical combiner 108 faces the IR camera 106. The processor 110 is configured to perform various operations, as described earlier with respect to the aforementioned first aspect.

Optionally, the system 100 further comprises at least one of: at least one additional camera (for example, depicted as an additional camera 116), at least one additional IR camera (for example, depicted as an additional IR camera 118), tracking means 120, a light field display unit 122, at least one additional IR light source (for example, depicted as an additional IR light source 124). The additional camera 116 is arranged to face the IR camera 106 such that the IR camera 106 lies in a field of view of the additional camera 116. The additional IR camera 118 faces the light field display unit 122. The tracking means 120 is shown to be implemented, for example, as a camera. Optionally, the tracking means 120 is implemented at least partially using the IR camera 106. In some implementations, the IR camera 106 comprises at least a first IR camera and a second IR camera (not shown in FIG. 1A).

Notably, the optical combiner 108 is arranged on an optical path of the light field display unit 122 and on an optical path of a real-world light field of a real-world environment. In some implementations, said real-world light field is incoming from a front windshield (not shown) of the vehicle present the real-world environment. In such an implementation, the front windshield of the vehicle may be utilised as the optical combiner 108. Moreover, in such an implementation, the light field display unit 122 may be implemented as a liquid-crystal display (LCD) with a backlight (not shown). It will be appreciated that the light field display unit 122 and the optical combiner 108 may constitute the heads-up display.

With reference to FIG. 1B, the IR camera 106 is shown to comprise at least a first IR camera 126a and a second IR camera 126b. A set of IR-responsive markers 128 is shown to be located within the optical combiner 108, and also on the semi-reflective surface 114 of the optical combiner 108. 130 represents a constructional element, for example, such as an A-pillar, of the vehicle. The additional IR camera 118 faces the light field display unit 122.

It may be understood by a person skilled in the art that FIG. 1A and FIG. 1B include a simplified example implementation of the system 100, for sake of clarity, which should not unduly limit the scope of the claims herein. It is to be understood that a specific implementation of the system 100 is not to be construed as limiting it to specific numbers or types of IR light sources, IR cameras, optical combiners, processors, additional cameras, additional IR cameras, tracking means, light field display units, additional light sources, and IR-responsive markers. The person skilled in the art will recognize many variations, alternatives, and modifications of embodiments of the present disclosure.

Figure 2:
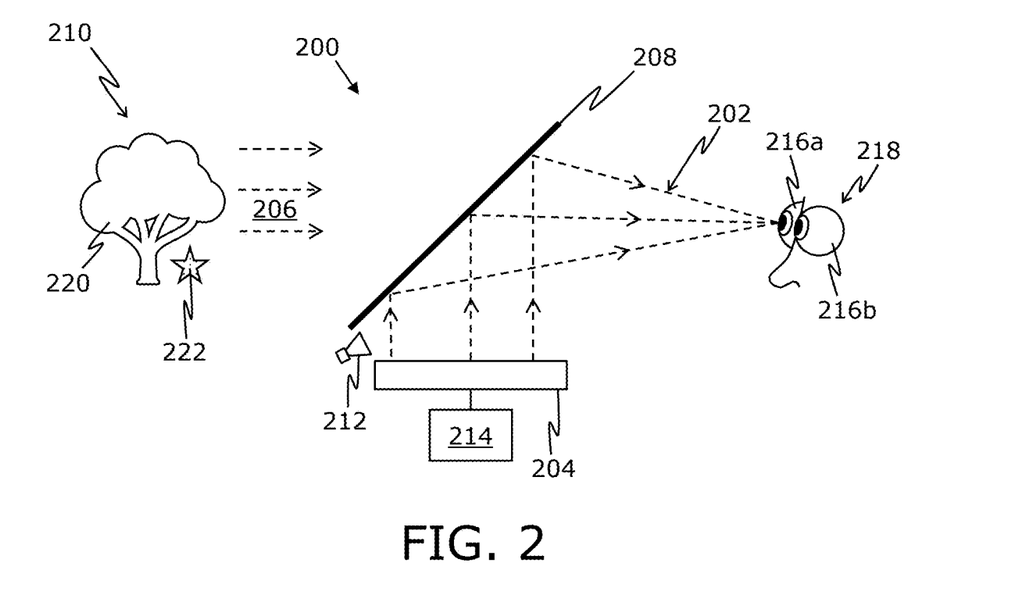
FIG. 2 illustrates an exemplary scenario in which a synthetic light field is produced using a light field display unit, and is optically combined with a real-world light field using an optical combiner, in accordance with an embodiment of the present disclosure.

Referring to FIG. 2, illustrated is an exemplary scenario 200 in which a synthetic light field 202 is produced using a light field display unit 204, and is optically combined with a real-world light field 206 using an optical combiner 208, in accordance with an embodiment of the present disclosure. A real-world environment 210 is shown, where tracking means 212 (for example, depicted as a camera) is utilised by at least one processor (for example, depicted as a processor 214) to determine a relative position of a first eye 216a and of a second eye 216b of at least one user (depicted as a user 218) with respect to the optical combiner 208, the optical combiner 208 being arranged on an optical path of the light field display unit 204 and on an optical path of the real-world light field 206 of the real-world environment 210. In the real-world environment 210, there are one or more real-world objects, depicted as a real-world object 220 (shown as a tree). An input to be employed by the light field display unit 204 is generated by the processor 214, based on the relative position of the first eye 216a and of the second eye 216b of the user 218 with respect to the optical combiner 208, and a curvature of the optical combiner 208. The input is employed at the light field display unit 204 to produce the synthetic light field 202 presenting virtual content 222, for example, such as a virtual object (depicted as a star having a dotted pattern). For illustration purposes only, the virtual content 222 is shown to be presented at an optical depth that is (almost) same as an optical depth of the real-world object 220. The optical combiner 208 is employed to reflect a first part and a second part of the synthetic light field 202 towards the first eye 216a and the second eye 216b, respectively, whilst optically combining the first part and the second part of the synthetic light field 202 with the real-world light field 206.

FIG. 2 is merely an example, which should not unduly limit the scope of the claims herein. A person skilled in the art will recognize many variations, alternatives, and modifications of embodiments of the present disclosure.

Figure 3:
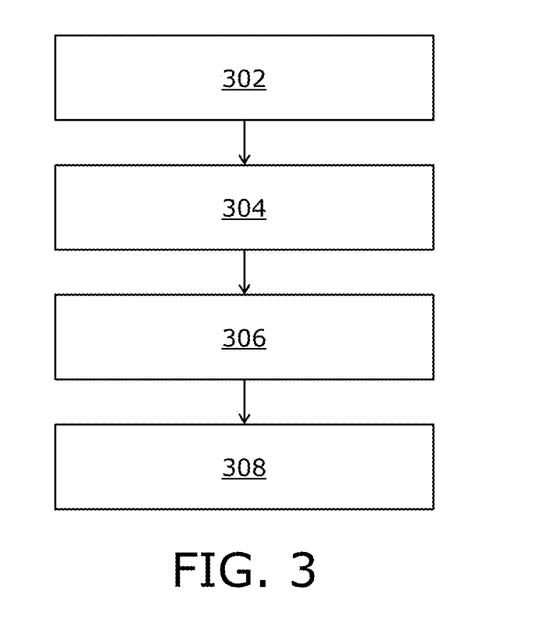
FIG. 3 illustrates steps of a method for calibrating a heads-up display using infrared-responsive markers, in accordance with an embodiment of the present disclosure.

Referring to FIG. 3, illustrated are steps of a method for calibrating a heads-up display using infrared-responsive markers, in accordance with an embodiment of the present disclosure. At step 302, at least one infrared (IR) camera is controlled to capture at least one IR image of an optical combiner, whilst at least one IR light source is controlled to emit IR light towards the optical combiner, wherein the optical combiner is arranged on an optical path of a light field display unit and on an optical path of a real-world light field of a real-world environment, wherein a semi-reflective surface of the optical combiner faces the at least one IR camera, and wherein a set of IR-responsive markers are located in at least one of: (i) within the optical combiner, (ii) on the semi-reflective surface of the optical combiner. At step 304, at least a subset of the set of IR-responsive markers is detected in the at least one IR image. At step 306, for a given IR-responsive marker detected in the at least one IR image, a deformation in a shape of the given IR-responsive marker as captured in the at least one IR image with respect to a reference shape of the given IR-responsive marker, is determined. At step 308, a curvature of the optical combiner is determined, based on respective deformations in shapes of IR-responsive markers in at least said subset of the set.

The aforementioned steps are only illustrative and other alternatives can also be provided where one or more steps are added, one or more steps are removed, or one or more steps are provided in a different sequence without departing from the scope of the claims.

The invention claimed is:

1. A system comprising:
   at least one infrared light source;
   at least one IR camera;
   an optical combiner arranged on an optical path of a light field display unit and on an optical path of a real-world light field of a real-world environment, wherein a semi-reflective surface of the optical combiner faces the at least one IR camera, and wherein a set of IR-responsive markers are located in at least one of: within the optical combiner, (ii) on the semi-reflective surface of the optical combiner; and
   at least one processor configured to:
      control the at least one IR camera to capture at least one IR image of the optical combiner, whilst controlling the at least one IR light source to emit IR light towards the optical combiner;
      detect at least a subset of the set of IR-responsive markers in the at least one IR image;
      for a given IR-responsive marker detected in the at least one IR image, determine a deformation in a shape of the given IR-responsive marker as captured in the at least one IR image with respect to a reference shape of the given IR-responsive marker; and
      determine a curvature of the optical combiner, based on respective deformations in shapes of IR-responsive markers in at least said subset of the set.

2. The system of claim 1, wherein the at least one IR camera comprises at least a first IR camera and a second IR camera whose fields of view overlap at least partially, wherein the at least one processor is configured to:
   detect at least one IR-responsive marker in a first IR image and a second IR image that are captured simultaneously via the first IR camera and the second IR camera, respectively;
   determine a position of the at least one IR-responsive marker, based on a first pose and a second pose of the first IR camera and the second IR camera from which the first IR image and the second IR image are captured, respectively; and
   determine the curvature of the optical combiner, based further on a change in the position of the at least one IR-responsive marker.

3. The system of claim 2, wherein the at least one processor is configured to:
   detect, in the first IR image and the second IR image, at least one object that is in a proximity of the optical combiner;
   determine a position of the at least one object, based on the first pose of the first IR camera and the second pose of the second IR camera;
   determine a relative position of the at least one IR-responsive marker with respect to the at least one object, based on the position of the at least one IR-responsive marker and the position of the at least one object; and
   determine the curvature of the optical combiner, based further on the relative position of the at least one IR-responsive marker with respect to the at least one object.

4. The system of claim 3, wherein the at least one processor is configured to determine a change in at least one of: a position, an orientation, of the optical combiner, based on a change in the relative position of the at least one IR-responsive marker with respect to the at least one object.

5. The system of claim 1, further comprising at least one additional camera, wherein the at least one IR camera lies in a field of view of the at least one additional camera, and wherein the at least one processor is configured to:
   control the at least one additional camera to capture an image of the at least one IR camera;
   detect the at least one IR camera in the image;
   determine a change in at least one of: a position, an orientation, of the at least one IR camera, based on a current location of the at least one IR camera in the image, and a reference location of the at least one IR camera in a reference image; and
   determine the curvature of the optical combiner, based further on the change in the at least one of: the position, the orientation, of the at least one IR camera.

6. The system of claim 1, further comprising tracking means and the light field display unit, wherein the at least one processor is configured to:
   determine a relative position of a first eye and of a second eye of at least one user with respect to the optical combiner, by utilising the tracking means;
   generate an input to be employed at the light field display unit for producing a synthetic light field, based on the relative position of the first eye and of the second eye of the at least one user with respect to the optical combiner, and the curvature of the optical combiner; and
   employ the input at the light field display unit to produce the synthetic light field, wherein the optical combiner is employed to reflect a first part and a second part of the synthetic light field towards the first eye and the second eye of the at least one user, respectively, whilst optically combining the first part and the second part of the synthetic light field with the real-world light field.

7. The system of claim 6, wherein the tracking means is implemented at least partially using the at least one IR camera.

8. The system of claim 6, further comprising:
at least one additional IR camera facing the light field display unit; and
optionally, at least one additional IR light source,
wherein an additional set of IR-responsive markers are located on at least one optical layer of the light field display unit, and wherein the at least one processor is configured to:
control the at least one additional IR camera to capture at least one additional IR image of the light field display unit, whilst controlling the at least one IR light source or the at least one additional IR light source to emit IR light towards the light field display unit;
detect at least a subset of the additional set of IR-responsive markers in the at least one additional IR image;
for a given IR-responsive marker detected in the at least one additional IR image, determine a deformation in a shape of the given IR-responsive marker as captured in the at least one additional IR image with respect to a reference shape of the given IR-responsive marker; and
determine a curvature of the at least one optical layer of the light field display unit, based on respective deformations in shapes of IR-responsive markers in at least said subset of the additional set,
wherein the input to be employed at the light field display unit is generated based further on the curvature of the at least one optical layer of the light field display unit.

9. The system claim 1, wherein the set of IR-responsive markers are implemented as absorptive IR-blocking markers, and wherein the semi-reflective surface is IR reflecting, wherein the at least one processor, is configured to:
detect a face of at least one user in the at least one IR image; and
determine a relative position of a head or eyes of the at least one user with respect to the optical combiner, based on a location of the face in the at least one IR image.

10. A method comprising:
controlling at least one infrared camera to capture at least one IR image of an optical combiner, whilst controlling at least one IR light source to emit IR light towards the optical combiner, wherein the optical combiner is arranged on an optical path of a light field display unit and on an optical path of a real-world light field of a real-world environment, wherein a semi-reflective surface of the optical combiner faces the at least one IR camera, and wherein a set of IR-responsive markers are located in at least one of: (i) within the optical combiner, (ii) on the semi-reflective surface of the optical combiner;
detecting at least a subset of the set of IR-responsive markers in the at least one IR image;
for a given IR-responsive marker detected in the at least one IR image, determining a deformation in a shape of the given IR-responsive marker as captured in the at least one IR image with respect to a reference shape of the given IR-responsive marker; and
determining a curvature of the optical combiner, based on respective deformations in shapes of IR-responsive markers in at least said subset of the set.

11. The method of claim 10, wherein the at least one IR camera comprises at least a first IR camera and a second IR camera whose fields of view overlap at least partially, wherein the method further comprises:
detecting at least one IR-responsive marker in a first IR image and a second IR image that are captured simultaneously via the first IR camera and the second IR camera, respectively;
determining a position of the at least one IR-responsive marker, based on a first pose and a second pose of the first IR camera and the second IR camera from which the first IR image and the second IR image are captured, respectively; and
determining the curvature of the optical combiner, based further on a change in the position of the at least one IR-responsive marker.

12. The method of claim 11, further comprising:
detecting, in the first IR image and the second IR image, at least one object that is in a proximity of the optical combiner;
determining a position of the at least one object, based on the first pose of the first IR camera and the second pose of the second IR camera;
determining a relative position of the at least one IR-responsive marker with respect to the at least one object, based on the position of the at least one IR-responsive marker and the position of the at least one object; and
determining the curvature of the optical combiner, based further on the relative position of the at least one IR-responsive marker with respect to the at least one object.

13. The method of claim 12, further comprising determining a change in at least one of: a position, an orientation, of the optical combiner, based on a change in the relative position of the at least one IR-responsive marker with respect to the at least one object.

14. The method of claim 10, further comprising:
controlling at least one additional camera to capture an image of the at least one IR camera, wherein the at least one IR camera lies in a field of view of the at least one additional camera;
detecting the at least one IR camera in the image;
determining a change in at least one of: a position, an orientation, of the at least one IR camera, based on a current location of the at least one IR camera in the image, and a reference location of the at least one IR camera in a reference image; and
determining the curvature of the optical combiner, based further on the change in the at least one of: the position, the orientation, of the at least one IR camera.

15. The method of claim 10, further comprising:
determining a relative position of a first eye and of a second eye of at least one user with respect to the optical combiner, by utilising tracking means;
generating an input to be employed at the light field display unit for producing a synthetic light field, based on the relative position of the first eye and of the second eye of the at least one user with respect to the optical combiner, and the curvature of the optical combiner; and
employing the input at the light field display unit to produce the synthetic light field, wherein the optical combiner is employed to reflect a first part and a second part of the synthetic light field towards the first eye and the second eye of the at least one user, respectively, whilst optically combining the first part and the second part of the synthetic light field with the real-world light field.

16. The method of claim 15, wherein the tracking means is implemented at least partially using the at least one IR camera.

17. The method of claim 15, further comprising:
- controlling at least one additional IR camera to capture at least one additional IR image of the light field display unit, whilst controlling the at least one IR light source or at least one additional IR light source to emit IR light towards the light field display unit, wherein the at least one additional IR camera faces the light field display unit, and wherein an additional set of IR-responsive markers are located on at least one optical layer of the light field display unit;
- detecting at least a subset of the additional set of IR-responsive markers in the at least one additional IR image;
- for a given IR-responsive marker detected in the at least one additional IR image, determining a deformation in a shape of the given IR-responsive marker as captured in the at least one additional IR image with respect to a reference shape of the given IR-responsive marker; and
- determining a curvature of the at least one optical layer of the light field display unit, based on respective deformations in shapes of IR-responsive markers in at least said subset of the additional set, wherein the input to be employed at the light field display unit is generated based further on the curvature of the at least one optical layer of the light field display unit.

18. The method of claim 10, wherein the set of IR-responsive markers are implemented as absorptive IR-blocking markers, and wherein the semi-reflective surface is IR reflecting, wherein the method further comprises:
- detecting a face of at least one user in the at least one IR image; and determining a relative position of a head or eyes of the at least one user with respect to the optical combiner, based on a location of the face in the at least one IR image.

* * * * *